United States Patent [19]

Kobayashi et al.

[11] Patent Number: 4,923,951

[45] Date of Patent: May 8, 1990

[54] PRODUCTION PROCESS OF AROMATIC POLYAMIDE

[75] Inventors: Tadashi Kobayashi; Shouji Obuchi, both of Omuta; Hiroaki Matsuno, Kumamoto; Mitsuo Wada, Omuta; Hiroshi Takayanagi, Yokohama, all of Japan

[73] Assignee: Mitsui Toatsu Chemicals, Incorporated, Tokyo, Japan

[21] Appl. No.: 306,943

[22] Filed: Feb. 7, 1989

[30] Foreign Application Priority Data

Feb. 8, 1988 [JP] Japan .................................. 63-25678
Nov. 30, 1988 [JP] Japan ................................. 63-301078
Dec. 28, 1988 [JP] Japan ................................. 63-334662

[51] Int. Cl.$^5$ ............................................ G08G 18/22
[52] U.S. Cl. ........................................ 528/48; 528/52; 528/53; 528/57
[58] Field of Search ........................ 528/48, 52, 53, 57

[56] References Cited

FOREIGN PATENT DOCUMENTS

| 151615 | 3/1982 | Japan . |
|--------|--------|---------|
| 13629  | 3/1983 | Japan . |
| 67723  | 6/1983 | Japan . |
| 204218 | 7/1983 | Japan . |
| 190517 | 2/1986 | Japan . |

*Primary Examiner*—Maurice J. Welsh
*Attorney, Agent, or Firm*—Fisher, Christen & Sabol

[57] ABSTRACT

An aromatic polyamide is produced by subjecting an aromatic diisocyanate and an aromatic dicarboxylic acid to polycondensation in the presence of an alkali metal compound and/or an alkaline earth metal compound as a catalyst in an aprotonic polar solvent. The aromatic polyamide can be rendered suitable for use in the production of high-tenacity fibers by charging in advance the solvent, aromatic dicarboxylic acid and catalyst in a mixing system, reducing the water content in the mixing system to at least 50 ppm and then introducing the aromatic diisocyanate to conduct the polycondensation.

12 Claims, No Drawings

PRODUCTION PROCESS OF AROMATIC POLYAMIDE

BACKGROUND OF THE INVENTION (a) Field of the Invention

This invention relates to a process for producing an aromatic polyamide from an aromatic diisocyanate and an aromatic dicarboxylic acid. More specifically, the present invention is concerned with a process for obtaining an aromatic polyamide, which is colored little and has a high polymerization degree, by using a particular reaction solvent.

(b) Description of the Invention

An aromatic polyamide produced by using an aromatic diisocyanate and an aromatic dicarboxylic acid as raw materials is an industrially useful material. A variety of production processes have therefore been disclosed. Examples known include to use as an aprotic polar solvent a linear or cyclic amide or phosphoryl amide such as N,N'-dimethylethyleneurea, N,N-dimethylformamide, dimethylacetamide, N-methylpyrrolidone, pyrrolidone, γ-butyrolactone or hexamethylphosphoric acid triamide, or a sulfoxide or sulfone such as tetramethylenesulfone, diphenylsulfone or dimethylsulfoxide and also to employ an alkali metal salt of a polycarboxylic acid as a catalyst (Japanese Patent Application Laid-Open No. 151615/1982); to use an alkali metal carbonate or alkali metal hydrogencarbonate as a catalyst (Japanese Patent Application Laid-Open No. 13629/1983); to use an alkali metal hydroxide as a catalyst (Japanese Patent Application Laid-Open No. 67723/1983); or to use an alkali metal compound as a catalyst and also to employ an N,N'-dimethylalkyleneurea as a solvent (Japanese Patent Application Laid-Open Nos. 190517/1986 and 204218/1983).

In the above production processes, the aromatic diisocyanate as one of the raw materials reacts with water contained in a trace amount in the reaction system causing deleterious effects on the molecular weight and physical properties of the resulting polymer. It has hence been common to use the solvent, aromatic dicarboxylic acid, catalyst, etc. after sufficiently drying them to reduce their water contents to their respective predetermined levels or lower. It however takes a long time to dry such aromatic dicarboxylic acids and catalysts in general and, in fact, it is difficult to dry them sufficiently. Among these materials, the alkali metal compound as a catalyst is hygroscopic and is therefore particularly troublesome upon its drying. Drying by microwave heating or the like has thus been attempted.

As has been mentioned above, drying of the raw materials and catalyst needed complex steps and, moreover, some problems were involved in their storage and control after their drying.

Even when solution polymerization was conducted as described above using materials dried separately, the molecular weight of the resulting polymer did not increase. It was therefore difficult to obtain a polymer usable for the production of fibers having high tenacity Various causes of these problems may be deduced. For example, water, which is a byproduct from the formation of a carboxylic acid salt from the aromatic dicarboxylic acid as a raw material and the alkali metal hydroxide or alkaline earth metal hydroxide as a catalyst, and water contained in a trace amount in the catalyst do not spread into the solvent. Therefore, they probably give certain deleterious effects to the aromatic diisocyanate which reacts on the surface of the catalyst

SUMMARY OF THE INVENTION

An object of this invention is to provide an aromatic polyamide, which is suitable especially for the production of low-color fibers of high polymerization degree and tenacity, from an aromatic diisocyanate and an aromatic dicarboxylic acid.

The above-described object of this invention can be attained by the following process:

"A process for producing an aromatic polyamide by subjecting an aromatic diisocyanate and an aromatic dicarboxylic acid to polycondensation in the presence of an alkali metal compound and/or an alkaline earth metal compound as a catalyst in an aprotonic polar solvent, which comprises charging in advance the solvent, aromatic dicarboxylic acid and catalyst in a mixing system, reducing the water content in the mixing system to at least 50 ppm and then introducing the aromatic diisocyanate to conduct the polycondensation".

In addition, the object of this invention can be achieved more effectively by heating the mixing system to 100° C. or higher and removing low boiling-point substances.

DETAILED DESCRIPTION OF THE INVENTION

Any aromatic diisocyanate is usable as a monomer in the process of the present invention so long as it does not contain any functional group active to carboxylic acids other than the two isocyanate groups. As exemplary aromatic diisocyanates, may be mentioned diisocyanates derived from biphenyl compounds, diisocyanates derived from diphenyl compounds, diisocyanates derived from naphthalene compounds, diisocyanates derived from phenyl compounds, etc. For example, as diisocyanates derived from biphenyl compounds, may be mentioned biphenyl-2,4'-diisocyanate, biphenyl-4,4'-diisocyanate, 3,3'-dimethylbiphenyl-4,4'-diisocyanate, 3,3'-dimethoxybiphenyl-4,4'-diisocyanate and 2-nitrobiphenyl-4,4'-diisocyanate; as diisocyanates derived from diphenyl compounds, diphenylmethane-4,4'-diisocyanate, diphenylmethane-2,2'-diisocyanate, diphenylmethane-2,4'-diisocyanate, 3,3'-dichlorodiphenylmethane-4,4'-diisocyanate, 3,5-dimethyldiphenylmethane-4,4'-diisocyanate, 2,2'-dimethyldiphenylmethane-4,4'-diisocyanate, 3,3'-dimethyldiphenylmethane-4,4'-diisocyanate, 3-methoxydiphenylmethane-4,4'-diisocyanate, 2,4,6-trimethyldiphenylmethane-3,4'-diisocyanate, 2,2',5,5'-tetramethyldiphenylmethane-4,4'-diisocyanate, 3,3'-dimethoxydiphenylmethane-4,4'-diisocyanate, 4,4'-dimethoxydiphenylmethane-3,3'-diisocyanate, 4,4'-diethoxydiphenylmethane-3,3'-diisocyanate, 2,2'-dimethyl-5,5'-dimehtoxydiphenylmethane-4,4'diisocyanate, 3,3',5,5'-tetraisopropyldiphenylmethane-4,4'-diisocyanate, bis(4-isocyanatophenyl)dimethylmethane, bis(4-isocyanatophenyl)ditrifluoromethylmethane, bis(4-isocyanatophenyl)ditrifluoromethylmethane, bis(4-isocyanatophenyl)-2-nitrophenylmethane, bis(4-isocyanatophenyl)-4-nitrophenylmethane, bis(4-isocyanate-2,5-dimethylphenyl)phenylmethane, bis(4-isocyanatophenyl)ethylene, bis(4-isocyanatophenyl)difluoroethylene, bis(4-isocyanatophenyl)cyclohexylmethane, bibenzyl-4,4-diisocyanate, bibenzyl-2,4-diisocyanate, diphenylether-4,4'-diisocyanate, and dipheylether-2,4'-diisocyanate; as diisocyanates derived from naphthalene compounds, naphthalene-1,4-diisocyanate, naphthalene-1,5-diisocyanate, 1-methylnaphthalene-1,5-diisocyanate, naphthalene-2,6-diisocyanate, naphthalene-2,7-diisocyanate, and 1,1'-dinaphthyl-2,2'-diisocyanate; and as diisocyanates derived from phenyl compounds, phenylene-1,2-diisocyanate, phenylene-1,3-diisocyanate, phenylene-1,4-diisocyanate, phenylene-2,4-diisocyanate, tolylene-2,4-diisocyanate and tolylene-2,6-diisocyanate.

In particular, tolylene-2,4-diisocyanate, diphenylmethane-4,4'-diisocyanate, phenylene-1,4'-diisocyanate, phenylene-1,3-diisocyanate and the like, which are available industrially, are often used. They may be used either singly or in combination.

Since these aromatic diisocyanates are apt to react with water, they are generally marketed in a sealed moisture free form so that they can be used directly for polymerization.

Regarding the other monomer, i.e., the aromatic dicarboxylic acid on the other hand, it is not absolutely necessary to use the aromatic dicarboxylic acid as a raw material after converting it into a moisture free form. Any aromatic compound containing no functional group active to isocyanates other than the two carboxyl groups may be used. Examples of the aromatic carboxylic acid include dicarboxylic acids derived from biphenyl compounds, dicarboxylic acids derived from diphenyl compounds, dicarboxylic acids derived from naphthalene compounds, dicarboxylic acids derived from phenyl compounds, etc. For example, may be mentioned as dicarboxylic acids derived from biphenyl compounds, biphenyl-2,4'-dicarboxylic acid, biphenyl-4,4'-dicarboxylic acid, 3,3'-dimethylbiphenyl-4,4'-dicarboxylic acid, 3,3'-dimethoxybiphenyl-4,4'-dicarboxylic acid, and 2-nitrobiphenyl-4,4'-dicarboxylic acid; as dicarboxylic acids derived from diphenyl compounds, diphenylmethane-4,4'-dicarboxylic acid, diphenylmethane-2,2'-dicarboxylic acid, diphenylmethane-2,4'-dicarboxylic acid, 3,3'-dichlorodiphenylmethane-4,4'-dicarboxylic acid, 3,5-dimethyldiphenylmethane-4,4'-dicarboxylic acid, 2,2'-dimethyldiphenylmethane-4,4'-dicarboxylic acid, 3,3'-dimethyldiphenylmethane- 4,4'-dicarboxylic acid, 3-methoxydiphenylmethane-4,4'-dicarboxylic acid, 2,4,6-trimethyldiphenylmethane-3,4'-dicarboxylic acid, 2,2',5,5'-tetramethyldiphenylmethane-4,4'-dicarboxylic acid, 3,3'-dimethoxydiphenylmethane-4,4'-dicarboxylic acid, 4,4'-dimethoxydiphenylmethane-3,3'-dicarboxylic acid, 4,4'-diethoxydiphenylmethane-3,3'-dicarboxylic acid, 2,2'-dimethyl-5,5'-dimethoxydiphenylmethane-4,4'-dicarboxylic acid, 3,3',5,5'-tetraisopropyldiphenylmethane-4,4'-dicarboxylic acid, bis(4-carboxyphenyl)dimethylmethane, bis(3-chloro-4-carboxyphenyl)dimethylmethane, bis(4-carboxyphenyl)ditrifluoromethylmethane, bis(4-carboxyphenyl)-2-nitrophenylmethane, bis(4-carboxyphenyl)-4-nitrophenylmethane, bis(4-carboxy-2,5-dimethylphenyl)phenylmethane, bis(4-carboxyphenyl)ethylene, bis(4-carboxyphenyl)difluoroethylene, bis(4-carboxyphenyl)cyclohexylmethane, bibenzyl-4,4'-dicarboxylic acid, bibenzyl-2,4'-dicarboxylic acid, diphenylether-4,4'-dicarboxylic acid, and diphenylether-2,4'-dicarboxylic acid; as dicarboxylic acids derived from naphthalene compounds, naphthalene-1,4-dicarboxylic acid, naphthalene-1,5-dicarboxylic acid, 1-methylnaphthalene-1,5-dicarboxylic acid, naphthalene-2,6-dicarboxylic acid, naphthalene-2,7-dicarboxylic acid, and 1,1'-dinaphthyl-2,2'-dicarboxylic acid; and as dicarboxylic acids derived from phenyl compounds, phenylene-1,2-dicarboxylic acid, phenylene-1,3-dicarboxylic acid, phenylene-1,4-dicarboxylic acid, tolylene-2,4-dicarboxylic acid, and tolylene-2,6-dicarboxylic acid. In particular, phenylene-1,2-dicarboxylic acid, phenylene-1,3-dicarboxylic acid, phenylene-1,4-dicarboxylic acid, tolylene-2,4-dicarboxylic acid and the like are often used. They may also be used either singly or in combination.

The catalyst useful in the practice of the process of the present invention may be either an alkali metal compound or an alkaline earth metal compound. As exemplary alkali metal compounds, may be mentioned alkali metal hydroxides, alkali metal carbonates, alkali metal hydrogencarbonates, alkali metal carboxylates and alkali metal halides. On the other hand, examples of the alkaline earth metal include alkaline earth metal hydroxides, alkaline earth metal carbonates, alkaline earth metal carboxylates, and alkaline earth metal halides. For example, as alkali metal hydroxides may be mentioned lithium hydroxide, sodium hydroxide, and potassium hydroxide; as alkali metal carbonates, lithium carbonate, sodium carbonate, and potassium carbonate; as alkali metal hydrogencarbonates, lithium hydrogencarbonate, sodium hydrogencarbonate, and potassium hydrogencarbonate; as alkali metal carboxylates, mono- and di-lithium, sodium and potassium salts of the aromatic dicarboxylic acids described above; as alkali metal halides, lithium fluoride, sodium fluoride, potassium fluoride, lithium chloride, sodium chloride, potassium chloride, lithium bromide, sodium bromide, potassium bromide, lithium iodide, sodium iodide, and potassium iodide; as alkaline earth metal hydroxides, beryllium hydroxide, magnesium hydroxide, and calcium hydroxide; as alkaline earth metal carbonates, beryllium carbonate, magnesium carbonate, and calcium carbonate; as alkaline earth metal carboxylates, beryllium, magnesium and calcium salts of the aromatic dicarboxylic acids described above. They may be used either singly or in combination. No particular limitation is imposed on the catalyst.

These catalysts may be used preferably in an amount of 0.1–5.0 mole % based on the aromatic dicarboxylic acid. Amounts smaller than 0.1 mole % render the velocity of the polycondensation reaction slower thereby failing to provide a polymer solution suitable for use in the production of fibers having a narrower molecular weight distribution. On the other hand, amounts greater than 5.0 mole % render the catalyst difficult to be dissolved in the polymer solution, whereby a need arises to filter out the catalyst remaining in the reaction mass so that the operation becomes complex. It is hence not preferable to use the catalyst in such an unduly small or large amount.

An aprotic polar solvent is used in this invention. Examples of the aprotic polar solvent include N,N'-dimethylalkyleneureas, dimethylacetamide, dimethylsulfoxide, sulfolane, N-methyl-2-pyrrolidone, hexamethylphosphoric triamide, etc. Certain N,N'-dimethylalkyleneureas, namely, N,N'-dimethylethyleneurea, N,N'-dimethylpropyleneurea and N,N'-dimethylbutyleneurea are preferred, with N,N'-dimethylethyleneurea being particularly preferred.

These solvents may be used either singly or in combination. No particular limitation is imposed on the solvent. It is also possible to use another solvent, which is inert to the condensation reaction, in combination with the aprotonic polar solvent. Typical solvents include benzene, toluene, xylene, naphthalene, octane, trichloroethylene, tetrachloroethylene, diglime and the like. They may also be used either singly or in combination.

The solvent may preferably be used in an amount of 3–50 times by weight the total amount of the aromatic dicarboxylic acid and aromatic diisocyanate. In the present invention, the production is feasible up to a polymer concentration of about 25 wt. % in the reaction. The polymer concentration is however adjustable as desired, depending on reaction conditions for the reaction. A suitably-diluted concentration is chosen to prevent the viscosity of the reaction mixture increasing so much that the stirring becomes no longer feasible, or the polymer deposits.

In the process of this invention, the solvent, aromatic dicarboxylic acid and catalyst are charged in a reaction vessel. After reducing the water content in the mixing system to 50 ppm or lower in advance, the aromatic diisocyanate is introduced so that a polymer solution suitable especially for the production of fibers can be obtained. The water content in the reaction mixture is reduced to 50 ppm or lower—preferably to 20 ppm or lower. No particular limitation is imposed on the means for reducing the water content. As a preferred method, it is however suggested that the mixing system be heated at 100° C. or higher so that water can be removed together with low boiling-point substances. These methods will hereinafter be described in detail.

No limitation is imposed on the order in which the solvent, aromatic dicarboxylic acid and catalyst are charged, so that the order can be chosen as desired. Any method may be used to obtain dehydration so long as the reaction solution of the solvent, catalyst and aromatic dicarboxylic acid can be dehydrated to 50 ppm or lower. No particular limitation is imposed thereon. Dehydration methods using an adsorbent; dehydration methods relying upon distillation; and like methods may be used by way of example. As a dehydration method using an adsorbent, the reaction mixture may be passed through a column packed with a molecular sieve.

As a dehydration method relying upon distillation, no particular limitation is imposed because any method may be used so long as low boiling-point compounds such as water can be separate and removed from the reaction system. For example, the reaction vessel may be provided with a multi-stage rectifying column. It is also feasible to use distillation equipment alone, such as a Dean-Stark column. For dehydration, any pressure may be used, i.e., reduced, normal or elevated. Further, any temperature can be used which is relevant to the solvent and pressure employed each time. However, dehydration efficiency becomes poorer as the temperature drops, and no efficient dehydration is feasible at 100° C. or lower no matter how much the degree of pressure reduction is increased. It is hence preferable to conduct the reaction at 100° C. or higher. For efficient dehydration, it is also effective to feed an inert gas into the reaction vessel or the reaction mixture. Most efficient dehydration can be achieved by feeding an inert gas into the reaction mixture, for example, under normal pressure or elevated pressure at a temperature near the boiling point of the solvent. This method is therefore most suitable. As suitable inert gases include helium, nitrogen, argon, xenon and the like. They may be used either singly or in combination. Nitrogen is especially preferred because it permits effective dehydration and its price is low.

In the polycondensation method according to this invention, the diisocyanate may be used in a molar ratio of from 0.70 to 1.30 per mole of the aromatic dicarboxylic acid. The molar ratio may preferably be in a range of 0.95–1.10 with a substantially equivalent molar ratio being preferred in particular.

The diisocyanate may be added either at once or gradually. Where the reaction velocity is slow, it is preferable to introduce the diisocyanate while continuously adding it dropwise rather than adding it all at once.

Concerning temperature conditions for the polycondensation reaction, the temperature may preferably be at least 100° C. but lower than the boiling point of the solvent. A temperature range of 50°–200° C. is particularly preferred. Temperatures lower than 100° C. result in an unduly slow reaction velocity, thereby failing to provide a high molecular-weight polymer suitable for use in the production of fibers having a narrow molecular weight distribution. If the reaction temperature is higher than 200° C., on the contrary, the high molecular-weight polymer formed by the reaction crystallizes so that the polymerization mixture becomes a gel-like mass and the subsequent spinning is rendered no longer feasible.

The reaction time may generally range from 30 minutes to 5 hours. The reaction may be stopped when carbon dioxide as a byproduct is no longer recognizable at a practical level.

The aromatic polyamide obtained by the present invention as described above can readily provide high-tenacity fibers when spun by a routine method. The fibers thus obtained are suitable for the production of various fiber and textile products. They can be used, either as they are or in combination with one or more other resins, for various applications such as the production of films, sheets and other paper-like products.

Examples will hereinafter be described. Physical properties of polymers obtained in Examples and Comparative Examples were measured by the following methods:

Inherent viscosity, $\eta_{inh}$, is expressed by the following formula:

$$\eta_{inh} = \frac{\ln (t/t_0)}{c}$$

where
  $t_0$: time required for a solvent to flow down through a viscometer;
  $t$: time required for a dilute solution of a polymer in the same solvent to flow down through the same viscometer; and
  $c$: solid concentration of the polymer, as expressed in terms of grams, per 100 ml of the solvent.

The polymer solid content of each polymerization mixture was calculated from the amounts of the monomers and solvent charged. The polymerization mixture was then diluted with N-methylpyrrolidone to give a polymer solid concentration of 0.1 g per 100 ml and the inherent viscosity was measured at 30° C. Average molecular weight:

Each polymerization mixture was diluted with dimethylformamide. By gel permeation chromatography (GPC), the peak of the corresponding molecular weight distribution curve was measured and the average molecular weight was determined with reference to a calibration curve prepared likewise using polystyrene as a standard. Viscosity:

After storing each polymerization mixture overnight in a constant-temperature chamber of 23° C., its viscosity was measured using a conventional Brookfield viscometer (BH type, manufactured by Tokyo Keiki Co., Ltd.).

Further, the water contents of solvents and solutions were each measured at room temperature by means of a Karl Fischer moisture meter ("MK-210" model, trade name; manufactured by Kyoto Electronics Manufacturing Co., Ltd.; coulometric titration type).

EXAMPLE 1

Charged in 1-l reactor equipped with stirrer, thermometer, condenser, dropping funnel and nitrogen inlet tube in a nitrogen atmosphere were 837 g of N,N'-dimethylethyleneurea (hereinafter abbreviated as "DMEU"), 33.2 g (0.200 mole) of terephthalic acid and 0.080 g (1.0 mole % based on the terephthalic acid) of sodium hydroxide. After stirring the resultant mixture into a solution, its water content was measured. It was found to be about 500 ppm.

While feeding nitrogen gas at a rate of 1.0 l/min into the solution, the solution was heated to 200° C. and was then maintained for 1 hour at the same temperature to distill 87.2 g of DMEU.

After cooling the mixing system, the water content of the solution was measured. It was found to be not higher than 10 ppm.

Next, the solution was heated to 200° C. in a nitrogen atmosphere, followed by continuous dropwise addition of 34.8 g (0.200 mole) of tolylene-2,4-diisocyanate from the dropping funnel over 1.5 hours. After completion of the dropwise addition, the reaction mixture was subjected to aging for 30 minutes. The reaction mixture was thereafter allowed to cool down at room temperature, thereby obtaining a polymerization mixture of a pale yellow color.

The viscosity, inherent viscosity $\eta_{inh}$ and average molecular weight were 110 poises, 2.12 and 275,000 respectively.

When the polymerization mixture was extruded into a coagulating solution (DMEU/CaCl$_2$/water) of 50° C. by using a conventional wet spinning apparatus, spinning was feasible without end breakage. Subsequent drying and stretching gave 2-denier filaments. Their tenacity was 6.8 g/denier.

EXAMPLE 2

Following the procedure of Example 1 except among the conditions for the dehydration of the mixing system, the nitrogen gas flow rate, temperature and depressurization degree were changed to 0.5 l/min, 110° C. and 50 mmHg respectively, 89.0 g of DMEU was distilled out in 2 hours. At that time, the water content of the reaction mixture was 17 ppm.

A polycondensation reaction was then conducted in a similar manner as in Example 1. As a result, the viscosity, inherent viscosity $\eta_{inh}$ and average molecular weight were 73 poises, 2.05 and 270,000 respectively.

Spinning of the polymerization mixture gave filaments whose tenacity was 6.0 g denier.

EXAMPLE 3

Following the procedure of Example 1 except that among the dehydration conditions, the atmosphere was change to a nitrogen atmosphere and the temperature was set at 220° C., 91.0 g of DMEU was distilled out in 1.5 hours. At that time, the water content of the reaction mixture was not higher than 10 ppm.

A polycondensation reaction was then conducted in a similar manner as in Example 1. As a result, the viscosity, inherent viscosity $\eta_{inh}$ and average molecular weight were 97 poises, 2.11 and 270,000 respectively.

Spinning of the polymerization mixture gave filaments whose tenacity was 6.2 g/denier.

COMPARATIVE EXAMPLE 1

Following the procedure of Example 1 except that among the conditions for the dehydration of the mixing system, the nitrogen gas flow rate, temperature and depressurization degree were changed to 0.2 l/min, 80° C. and 5 mmHg respectively, 85.1 g of DMEU was distilled out in 6 hours. At that time, the water content of the reaction system was 90 ppm.

A polycondensation reaction was then conducted in a similar manner as in Example 1. As a result, the viscosity, inherent viscosity $\eta_{inh}$ and average molecular weight were 5 poises, 1.14 and 165,000 respectively. Spinning was attempted with the polymerization mixture. End breakage however took place, so that its spinning was not feasible.

COMPARATIVE EXAMPLE 2

In 1-l reactor equipped with stirrer, thermometer, condenser and dropping funnel, was charged 837 g of DMEU which had been dehydrated and dried to a water content of 10 ppm max. by molecular sieve 4A. The reactor was charged further with 33.2 g (0.200 mole) of terephthalic acid, which had been dehydrated and dried at 150° C. for 15 hours under a reduced pressure of 3 mmHg, and 0.080 g (1.0 mole % based on the terephthalic acid) of sodium hydroxide in a nitrogen atmosphere. After stirring the resultant mixture into a solution, its water content was measured. It was found to be 65 ppm. A polycondensation reaction was then conducted in a similar manner as in Example 1. As a result, the viscosity, inherent viscosity $\eta_{inh}$ and average molecular weight were 23 poises, 1.69 and 213,000 respectively.

Spinning of the polymerization mixture gave filaments whose tenacity was 3 g/denier.

EXAMPLE 4

Dehydration was conducted in a similar manner as in Example 1 except that sulfolane was used in place of DMEU. When 83.2 g of sulfolane had been distilled out in 2 hours, the water content of the reaction mixture was not higher than 10 ppm. A polycondensation reaction was then conducted in a similar manner as in Example 1. As a result, the viscosity, inherent viscosity $\eta_{inh}$ and average molecular weight were 99 poises, 2.07 and 270,000 respectively.

Spinning of the polymerization mixture gave filaments whose tenacity was 6.5 g/denier.

EXAMPLES 5-15

Using the apparatus and operation method described in Example 1, experiments were conducted separately while changing the catalyst, monomers and polycondensation temperature conditions. Results are shown in Table 1. Incidentally, in each experiment, the water content of the reaction mixture after the dehydration was not higher than 10 ppm. Further, the molar ratio of the aromatic dicarboxylic acid to the aromatic diisocyanate was set at 1.0 in each experiment.

TABLE 1

| Ex. No. | Conditions for polymerization | | | | | Physical properties | | | Tenacity of filaments (g/denier) |
|---|---|---|---|---|---|---|---|---|---|
| | Monomer | | Catalyst | | | | | | |
| | Aromatic dicarboxylic acid | Aromatic diisocyanate | Kind | Amount (mole %/ dicarboxylic acid) | Temp. (°C.) | Viscosity (poises) | $\eta_{inh}$ | Molecular weight × 10,000 | |
| 5 | Terephthalic acid | Tolylene-2,4-diisocyanate | KOH | 2.0 | 200 | 130 | 2.15 | 28.0 | 6.5 |
| 6 | Terephthalic acid | Tolylene-2,4-diisocyanate | Ca(OH)$_2$ | 2.0 | 200 | 51 | 1.91 | 25.5 | 6.0 |
| 7 | Terephthalic acid | Tolylene-2,4-diisocyanate | Na$_2$CO$_3$ | 4.0 | 180 | 85 | 2.05 | 26.5 | 6.3 |
| 8 | Terephthalic acid | Tolylene-2,4-diisocyanate | NaHCO$_3$ | 1.0 | 160 | 65 | 1.95 | 26.0 | 6.0 |
| 9 | Terephthalic acid | Tolylene-2,4-diisocyanate | KF | 1.0 | 160 | 140 | 2.19 | 28.4 | 6.9 |
| 10 | Terephthalic acid | Tolylene-2,4-diisocyanate | NaCl | 1.0 | 200 | 45 | 1.85 | 24.3 | 5.9 |
| 11 | Terephthalic acid | Tolylene-2,4-diisocyanate | CaCl$_2$ | 0.3 | 200 | 30 | 1.68 | 23.1 | 5.8 |
| 12 | Terephthalic acid | Tolylene-2,4-diisocyanate | Monosodium terephthalate | 1.0 | 190 | 95 | 2.08 | 26.9 | 6.2 |
| 13 | Terephthalic acid | Diphenyl-methane-4,4'-diisocyanate | NaOH | 1.0 | 190 | 102 | 1.83 | 25.8 | 6.0 |
| 14 | Isophthlaic acid | Tolylene-2,4-diisocyanate | NaOH | 1.0 | 190 | 86 | 1.78 | 24.8 | 6.0 |
| 15 | Terephthalic acid - 95 Isophthalic acid - 5 | Tolylene-2,4-diisocyanate | NaOH | 1.0 | 190 | 100 | 1.83 | 25.8 | 6.1 |

EXAMPLE 16

Added to 7500 g of N,N'-dimethylethyleneurea were 332 g (2 moles) of terephthalic acid and 0.8 g (1.0 mole % based on the terephthalic acid) of sodium hydroxide. The resultant mixture was heated to 50° C. to form a solution. The solution was caused to flow through a column packed with 500 g of molecular sieve 4A, whereby the solution was dehydrated. The water content of the solution was measured. It was found to be 40 ppm. 783 g of the dehydrated solution was weighed and charged in a reactor. A polycondensation reaction was then conducted in a similar manner as in Example 1. As a result, the viscosity, inherent viscosity $\eta_{inh}$ and average molecular weight were 38 poises, 1.75 and 236,000 respectively. Spinning of the polymerization mixture gave filaments whose tenacity was 5.8 g/denier.

We claim:

1. A process for producing an aromatic polyamide by subjecting an aromatic diisocyanate and an aromatic dicarboxylic acid to polycondensation in the presence of an alkali metal compound and/or an alkaline earth metal compound as a catalyst in an aprotonic polar solvent, which comprises charging in advance the solvent, aromatic dicarboxylic acid and catalyst in a mixing system, reducing the water content in the mixing system to at least 50 ppm and then introducing the aromatic diisocyanate to conduct the polycondensation.

2. The process as claimed in claim 1, wherein the water content in the mixing system is reduced to at least 20 ppm.

3. The process as claimed in claim 1, wherein the mixing system is heated to at least 100° C. to remove low boiling-point substances.

4. The process as claimed in claim 3, wherein an inert gas is introduced into a reaction mixture upon heating the mixing system to at least 100° C. to remove low boiling-point substances.

5. The process as claimed in claim 4, wherein the inert gas is nitrogen.

6. The process as claimed in claim 1, wherein the solvent is used in a range of 3–50 times by weight based on the total amount of the aromatic dicarboxylic acid and aromatic diisocyanate.

7. The process as claimed in claim 1, wherein the catalyst is used in a range of 0.1–5.0 mole % based on the amount of the aromatic dicarboxylic acid.

8. The process as claimed in claim 1, wherein the aprotonic polar solvent is an N,N'-dimethylalkyleneurea, tetramethylenesulfone or N-methyl-2-pyrrolidone.

9. The process as claimed in claim 1, wherein the aprotonic polar solvent is N,N'-dimethylethyleneurea.

10. The process as claimed in claim 1, wherein the aromatic diisocyanate is tolylene-2,4-diisocyanate or diphenylmethane-4,4'-diisocyanate and the aromatic dicarboxylic acid is terephthalic acid or isophthalic acid.

11. The process as claimed in claim 1, wherein the alkali metal compound and/or alkaline earth metal compound is sodium hydroxide, potassium hydroxide, calcium hydroxide, sodium carbonate, sodium bicarbonate, potassium fluoride, sodium chloride, calcium chloride or monosodium terephthalate.

12. The process as claimed in claim 1, wherein the polycondensation is conducted at 100°–200° C.

* * * * *